United States Patent [19]

Holley

[11] 3,730,105
[45] May 1, 1973

[54] CONVERTIBLE RAILHIGHWAY VEHICLE

[75] Inventor: John D. Holley, Montgomery, Ala.
[73] Assignee: Holley Engineering Co., Inc., Montgomery, Ala.
[22] Filed: Oct. 29, 1971
[21] Appl. No.: 193,654

[52] U.S. Cl. ............................ 105/215 C, 104/245
[51] Int. Cl. ........ B61d 15/00, B61f 9/00, B62d 61/12
[58] Field of Search .................. 104/245; 105/215 C

[56] References Cited

UNITED STATES PATENTS

| | | | |
|---|---|---|---|
| 2,655,872 | 10/1953 | Templeton | 105/215 C |
| 2,655,873 | 10/1953 | McDonald | 105/215 C |
| 2,968,260 | 1/1961 | Scheldrup | 105/215 C |
| 2,986,102 | 5/1961 | Cox | 105/215 C |
| 3,249,067 | 5/1966 | Keller | 105/215 C |
| 3,311,067 | 3/1967 | Gretzschel et al. | 105/215 C X |

Primary Examiner—Gerald M. Forlenza
Assistant Examiner—Howard Beltran
Attorney—William B. Kerkam

[57] ABSTRACT

A rail travel attachment for road vehicles having pneumatic tires includes a rail guide wheel adjacent each vehicle wheel for engagement with the rails of a railway. Longitudinal beams connected to the axles of the vehicle support front and rear rail guide wheels on each side of the vehicle. Hydraulically actuated jacks rotate each rail guide wheel into and out of engagement with the rails to guide the vehicle on the rails, rear pneumatic wheels of the vehicle resting on and engaging the rail. A manually actuated locking pawl associated with each of the hydraulically actuated jacks securely locks each rail guide wheel in either its rail engaging position or in its upper out-of-rail engaging position.

5 Claims, 3 Drawing Figures

Patented May 1, 1973 3,730,105

INVENTOR
JOHN D. HOLLEY

BY Cameron Kerkam & Sutton
ATTORNEYS

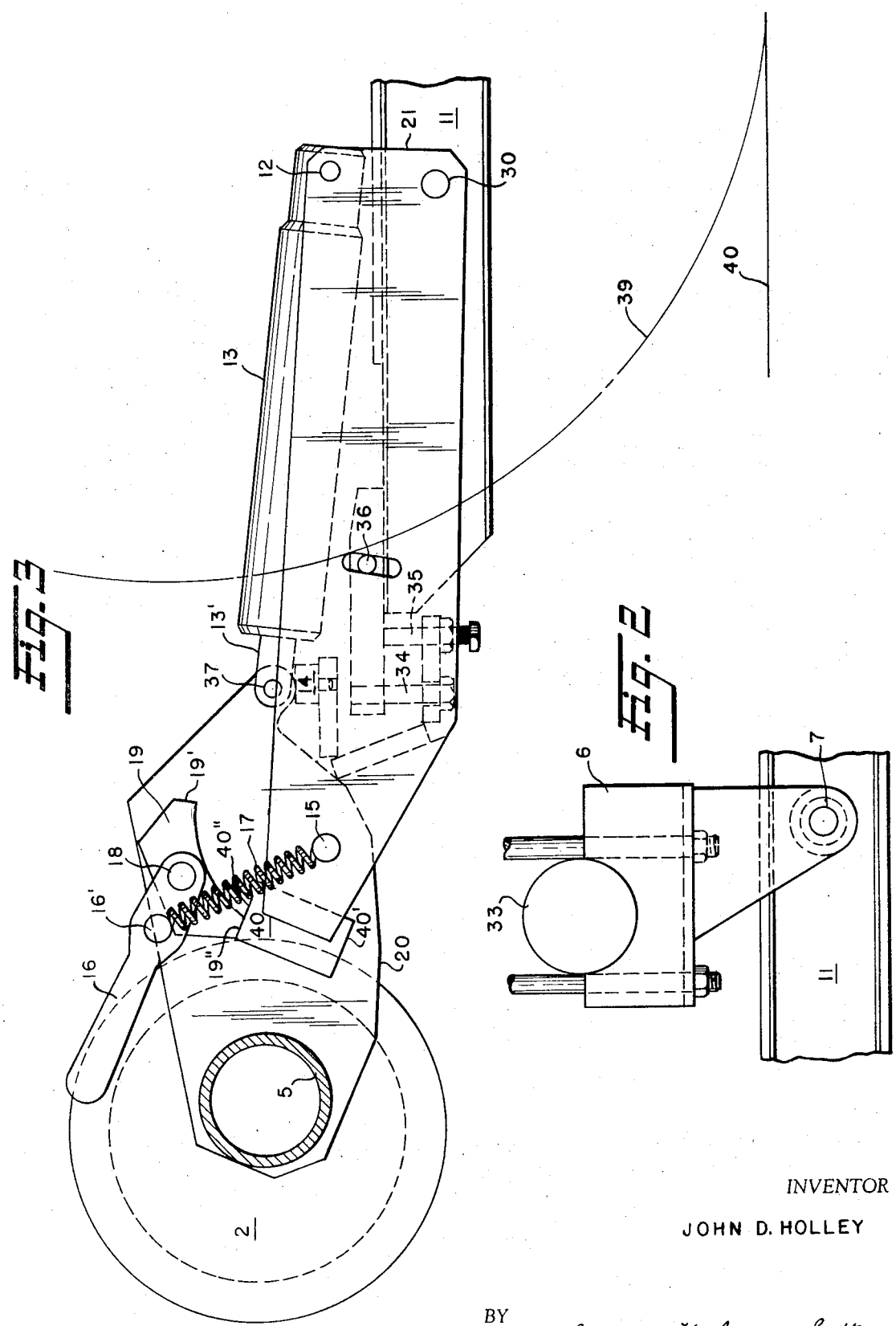

CONVERTIBLE RAILHIGHWAY VEHICLE

BACKGROUND OF THE INVENTION

The present invention relating as it does to rail travel attachment for use on road vehicles is found in a highly developed art, generally classified as railway rolling stock, trucks with supplemental wheels and in land vehicle attachments with retractable supports. Prior art patents such as U.S. Pat. No. 2,968,260 to A. H. Scheldrup dated Jan. 17, 1961; U.S. Pat. No. 2,986,102 to W. T. Cox dated May 30, 1961; U.S. Pat. No. 3,249,067 to R. E. Keller dated May 3, 1966; and U.S. Pat. No. 3,311,067 to H. Gretzchler et al. dated Mar. 28, 1967 show such rail travel attachments for ground vehicles in which longitudinal spaced beams are connected under the vehicle axles for alignment retention of the rail guide wheels and further these patents show hydraulic pistons and cylinders for bringing the rail guide wheels into engagement with the rails and for moving the rail guide wheels out of engagement with the rails. The patent to Keller discloses an over-the-center locking device for maintaining the rail guide wheels in engagement with the rails.

The present invention provides numerous advantages over the prior art and particularly in the locking pawl provided with over-the-center resilient actuating means for locking the rail guide wheel in its rail engaging position and its upper out-of-rail engaging position without play to prevent rattle and wear. Manual means are provided on the pawl for easily changing the over-the-center resilient means whereby the pawl is readily disengaged for movement of the rail guide wheel. The present invention also provides novel means for adjusting the position of each rail guide wheel supporting unit to readily adjust for the size, wear and inflation of the pneumatic tires of the vehicle.

SUMMARY OF THE INVENTION

The rail travel attachment includes a pair of spaced longitudinal beams secured to and beneath the axles of a road vehicle supported on pneumatic tires with a rail guide wheel mounted on each end of each beam adjacent a wheel of the vehicle and provided with a hydraulic piston and cylinder means for rotating each rail guide wheel into and out of engagement with the rail. The rail guide wheel is locked in either its rail engaging position or in its out-of-rail engaging position by a locking pawl actuated manually by an over-the-center resilient member. The rail guide or flanged wheel supporting structure engages a cushion when in raised position to prevent rattling and each rail wheel supporting structure is provided with adjusting screw means to provide for proper contact with the rail and to compensate for variations in size, pressure and wear of the vehicle tires.

DESCRIPTION OF THE DRAWINGS

In the accompanying drawings, in which like references characters indicate like parts, a preferred embodiment of the rail travel attachment of the present invention is shown for one rail guide or flanged wheel only, the support construction for each of the four rail guide or flanged wheels for the vehicle being identical. In these drawings.

FIG. 2 shows structure for connecting the longitudinal beams supporting the aligned, adjacent pairs of rail guide or flanged wheels to the rear axle of the vehicle; and FIG. 3 shows the embodiment of the invention of FIG. 1 with the rail guide wheel raised and locked out of rail engaging position.

DESCRIPTION OF THE PREFERRED EMBODIMENT

Figure 1:
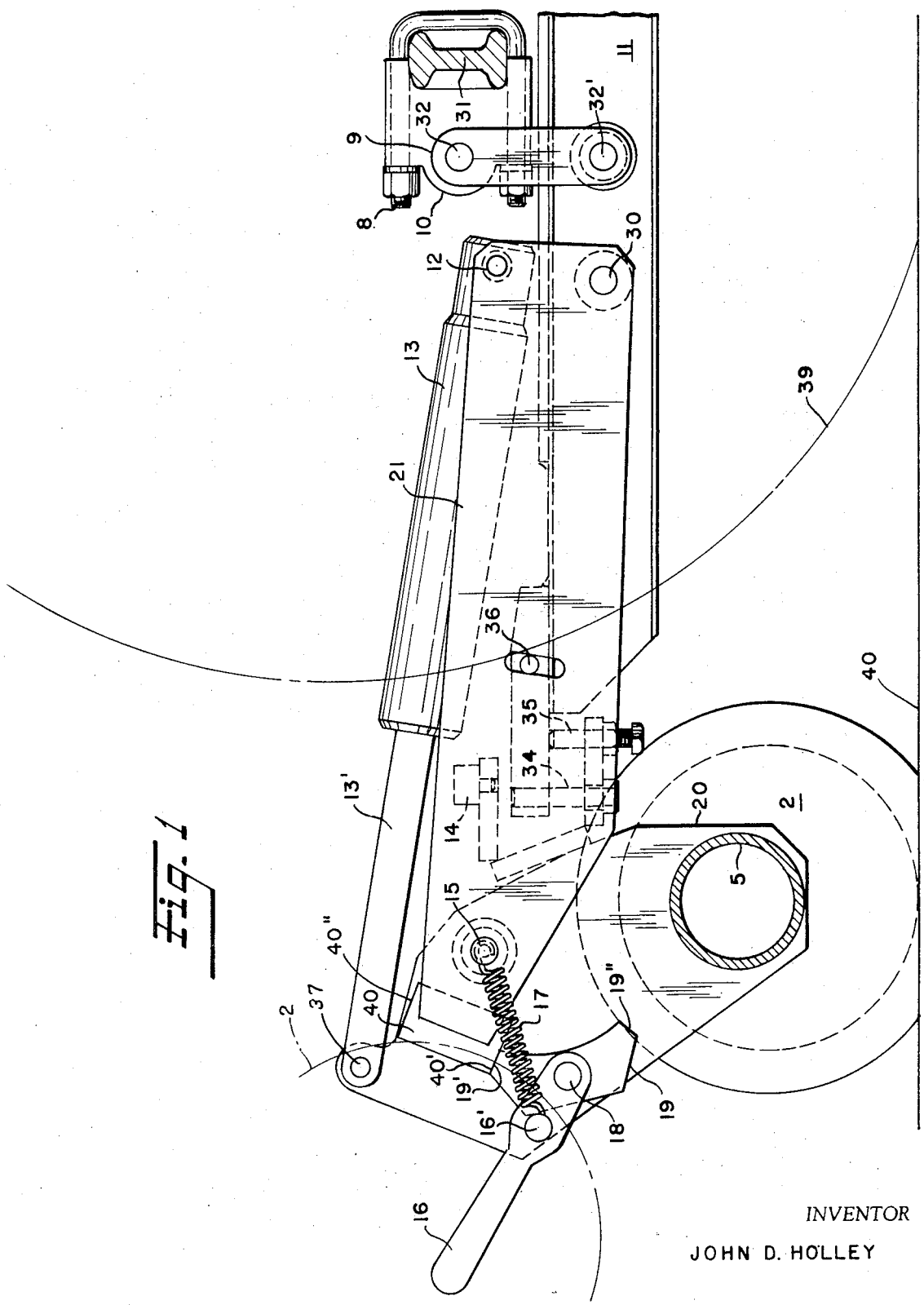
FIG. 1 shows a rail guide or flanged wheel in rail engaging position adjacent a front wheel of a road vehicle in accordance with the present invention.

Referring now to the several figures of the drawings, rail guide or flanged wheels 2 are attached at each end of longitudinally spaced beams 11 secured beneath the axles of the vehicle and to adjacent the pneumatic tires of the vehicle. FIGS. 1 and 3 show a front rail guide wheel 2 adjacent the front pneumatic tire 39 of the vehicle wheel located in front of front axle 31 of the vehicle. It is to be understood that each rail guide wheel 2 and its operating structure to be described hereinafter are identical so that it will suffice to describe but one of these constructions, it being understood that for the conventional four wheeled vehicle four such rail guide wheels are employed and the beams 11 are aligned, as shown in the prior art, whereby each rail guide wheel engages the rail when in lowered position in such a way that the adjacent one of the pneumatic tires of the vehicles rests upon and engages the rail shown generally in FIGS. 1 and 3 and 40. Each of the rail guide wheels 2 is mounted on suitable bearings in turn mounted on axle plate 20 which is pivotally mounted on a pivot pin 15. Pivot pin 15 is mounted in adjustment brackets 21. Pivot pin 15 is mounted in adjustable brackets 21 which in turn are pivotally mounted on the adjacent longitudinal rail 11 on pivot pin 30. Rails 11 are mounted beneath the axles of the vehicle and are connected to front axle 31 by axle blocks 10 and U-bolts 8. Shackle pin 32 passes through block 8 and supports shackle bars 9 which in turn are connected to rail 11 by shackle pin 32'. As seen in FIG. 2, rails 11 connect to the rear axle 33 of the vehicle by pivot pin 7, axle pad 6 and axle pad bolts 5.

Brackets 21 are adjusted vertically with respect to beam 11 to compensate for the size and wear of pneumatic tire 39 by oppositely acting screws 34 and 35, screw 34 raising brackets 21 with respect to beam 11 and screw 35 lowering brackets 21 with respect to beam 11, these screws being locked in conventional manner after adjustment. A lock bolt 36 may also be used to lock brackets 21 with respect to beam 11 after adjustment. A lock bolt 36 may also be used to lock brackets 21 with respect to beam 11 after adjustment of screws 34 and 35.

Axle plate 20 is pivotally rotated about pivot 15 by hydraulic cylinder 13 and its piston rod 13'. Cylinder 13 is pivotally connected to brackets 21 at pivot 12 and piston rod 13 is pivotally connected at 37 to axle plate 20. As seen in FIG. 1, rail guide wheel 2 is in lowered position in engagement with rail 40 and piston rod 13' is extended. In FIG. 3, rail guide wheel 2 is in retracted position and is rotated from rail engaging position through an angle of about 120° to clear the rail for highway travel position of the vehicle.

Axle plate 20 and rail guide wheel 2 are locked in rail engagement position by a locking pawl 19 having engaging surfaces 19' and 19''. Pawl 19 is pivotally mounted on pivot 18 carried by plate 20 and is urged into locking position by manually actuated handle 16 mounted on pivot 18 and urged into over-the-center position with respect to pivot 18 by spring 17 connected to handle 16 at pin 16' and to pivot 15. Pin 16' engages pawl 19 on opposite sides of pivot 18. As shown in FIG. 1, when rail guide wheel 2 is in engagement with rail 40, spring 17 urges handle 16 in a clockwise direction in an over-the-center position with respect to pivot 18 and through pin 16' engages surface 19' of pawl 19 with surface 40' of block 40 mounted between brackets 21. Engagement of the surface 19' with surface 40' of block 40 locks the rail guide wheel 2 in lowered position and the same cannot be accidentally retracted while at the same time wear and rattling is minimized.

When rail guide wheel 2 is to be raised, handle 16 is rotated in a counterclockwise direction as seen in FIG. 1 and spring 17 then passes over pivot 18 and will tend to rotate pawl 19 about pivot 18 in a counterclockwise direction to disengage surface 19' from surface 40'. It will probably be necessary to extend piston rod 13' a little to permit pawl 19 to rotate as above-described.

Piston rod 13' is then retracted into cylinder 13 rotating rail guide wheel 2 and supporting structure into the position shown in FIG. 3. It will be noted that in this raised position of rail guide wheel 2, plate 20 adjacent pivot 37 engages pad or resilient cushion 14 mounted between brackets 21 to prevent rattling and wear of the structure. It will also be noted that, in the raised position, pawl 19 is urged by spring 17 through pin 16' to rotate in a counterclockwise direction to bring pawl surface 19'' into engagement with surface 40'' of block 40 thus locking the assembly in raised position. Block 40 is preferably rectangular in elevation and surfaces 40' and 40'' are thus opposite and parallel.

When the assembly is to be lowered from the position shown in FIG. 3 to that shown in FIG. 1, lever 16 is manually rotated in a clockwise direction (Fig. 3) to bring spring 17 into an over-the-center position with respect to pivot 18 to rotate pawl 19 through pin 16' in a clockwise direction thus disengaging surfaces 19'' and 40''. A small retraction of piston rod 13' may be necessary to clear surfaces 19'' and 40''.

It should be noted that pawl 19 resiliently engages block 40 to provide additional relative movement therebetween to compensate for wear and of the various structural elements which prevents the assembly from rattling after long use. The arrangement of pawl 19 as above-described causes axle plate 20 to wedge tightly against resilient cushion 14 under all circumstances which, as noted above, may necessitate actuation of piston rod 13' in the appropriate direction to release the wedging pressure to permit spring 17 to release pawl 19 after spring 17 has been moved to the appropriate over-the-center position.

It is important that handle 16 engage locking pawl 19 through pin 16' in this "lost motion" manner to prevent reversal of the action of spring 17 until handle 16 is rotated to the opposite over-the-center position to urge pawl 19 to the unlocked position which then automatically occurs when piston rod 13' is appropriately actuated to release the pressure holding pawl 19 in locked position relative to block 40.

It will be understood that hydraulic power and controls to operate cylinders 13 are provided in conventional and known manner as from any suitable source of hydraulic fluid under pressure on the vehicle such as the power steering pump and any suitable hydraulic fluid control valve may be located on the vehicle for ready use by the operator.

Changes may be made to the above-described illustrative embodiment of the present invention in structural details thereof without departing from the present inventive concept. Reference should therefore be had to the appended claims to determine the scope of the present invention.

What I claim is:

1. A rail guide wheel assembly for wheeled road vehicles having spaced parallel beams secured beneath the axles of the vehicle and extending past the adjacent vehicle wheels comprising at each end of each of the beams a rail guide wheel raising and lowering a structure, said structure including brackets pivoted to the beam, means for adjusting the position of and for locking said brackets with respect to the beam, an hydraulic cylinder pivoted to said brackets, a piston rod for said cylinder, an axle plate pivotally mounted between said brackets, said piston rod being pivotally connected to said axle plate, an axle carried by said axle plate, rail guide wheels mounted on said axle, a lock block secured between said brackets, a pawl pivotally mounted on said axle plate, a pivot for said pawl, a surface on said pawl engaging a surface of said block when said rail guide wheel is in rail engaging position, a second surface on said pawl engaging a second surface on said block when said rail guide wheel is in raised position, a manually actuated handle for said pawl mounted on said pivot and engaging said pawl selectively on opposite sides of said pivot and resilient means urging said handle into engagement with said pawl.

2. An assembly as described in claim 1 including a resilient cushion mounted between said brackets and engaged by said axle plate when said rail guide wheel is in raised position.

3. An assembly as described in claim 1, said surface on said pawl and said second surface on said pawl being on opposite sides of said pivot.

4. An assembly as described in claim 1, said surface on said block and said second surface on said block being on opposite sides of said block.

5. An assembly as described in claim 1, said surface on said pawl and said second surface on said pawl being on opposite sides of said pivot and said surface on said block and said second surface on said block being on opposite sides of said block.

* * * * *